J. N. UNDERWOOD.
VEHICLE SPRING.
APPLICATION FILED JUNE 30, 1916.
1,264,457.
Patented Apr. 30, 1918.
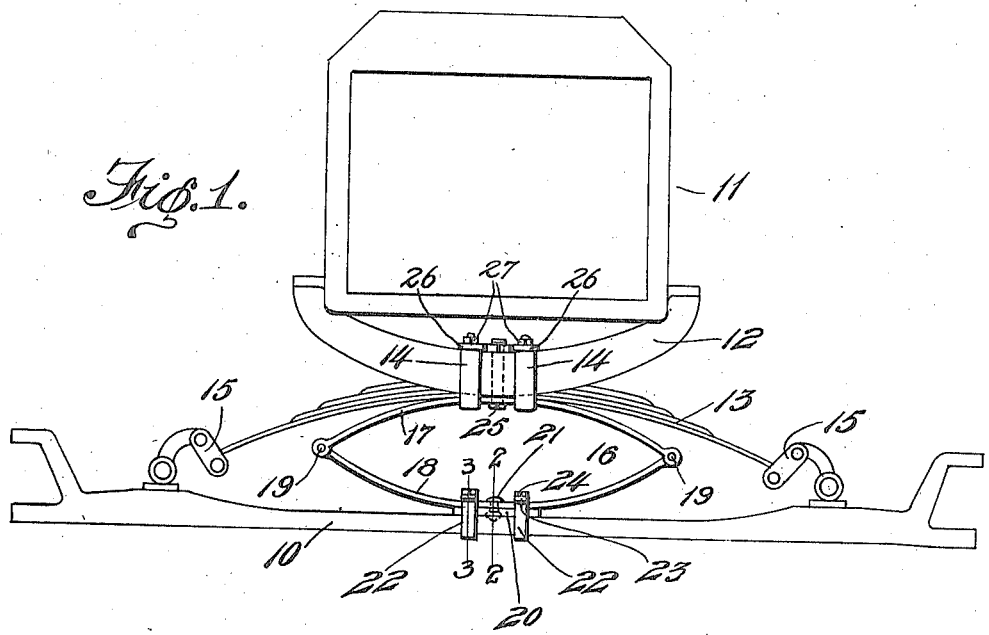
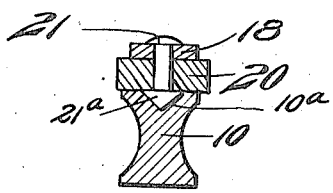
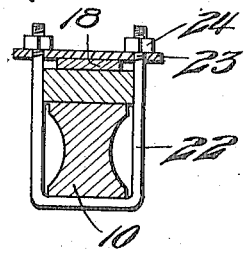
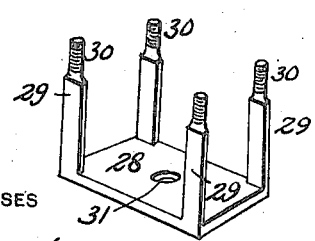
WITNESSES
INVENTOR
Josiah N. Underwood
BY
ATTORNEY

UNITED STATES PATENT OFFICE.

JOSIAH N. UNDERWOOD, OF WILLARD, NEW MEXICO.

VEHICLE-SPRING.

1,264,457.　　　　Specification of Letters Patent.　　Patented Apr. 30, 1918.

Application filed June 30, 1916. Serial No. 106,913.

*To all whom it may concern:*

Be it known that I, JOSIAH N. UNDERWOOD, a citizen of the United States, residing at Willard, in the county of Torrance and State of New Mexico, have invented certain new and useful Improvements in Vehicle-Springs, of which the following is a specification.

This invention relates to a spring for automobile vehicles and has for its object to provide a supplemental spring to be placed between the axle and the transverse spring of such vehicle to prevent the side motion of the automobile body, to hold the front wheels steady and the car easier riding and easier steering. It also serves in a measure as a shock absorber and neutralizes the recoil due to shocks; it prevents the breaking of the spring tie bolt and prevents the spring from slipping in the frame.

With these as the principal objects in view and others to be brought out in detail in the following description, the invention consists of the novel construction and arrangement of parts herein set forth and illustrated in the accompanying drawings, in which—

Figure 1 is a front elevation of the front axle, hood and spring connections of a motor car with the improvement applied thereto, Fig. 2 is a cross sectional view on an enlarged scale on the line 2—2 of Fig. 1, Fig. 3 is a similar view on the line 3—3 of Fig. 1, and Fig. 4 is a perspective view of a modification.

Referring to the drawing by numerals 10 indicates the front axle of an automobile, 11 the hood within which is the motor 12, the chassis supporting the hood and 13 the front spring extending transversely of the car and parallel with the axle 10, said spring being secured to the chassis by clamps 14 and to the axle by the usual links 15. The above-mentioned parts are common to a well known type of automobile to which the present invention is particularly adapted and which is shown in Fig. 1 in place between the axle 10 and the spring 13. Preferably the supplemental spring of the present invention is an elliptic spring 16, the upper and lower members 17 and 18 respectively being formed of a single leaf pivotally connected at their interengaging ends by pins 19. The lower leaf 18 rests upon a plate 20 and is secured thereto by a rivet 21 passing through the center of the leaf 18, said leaf and plate 20 being in turn connected with the axle 10 by U-clamps 22 that pass under the axle (see Fig. 3) and their ends through plates 23 that overlie the leaf 18 and are secured to the clamp 22 by nuts 24.

The spring 16 and plate 20 are prevented from moving laterally or transversely on the axle 10 by the head 21$^a$ of the bolt 21 which is made conical and is seated in a similarly shaped recess or depression 10$^a$ made in the center of the axle as clearly shown in Figs. 1 and 2. By means of this conical head and the clamps 22, the supplemental spring 16 is firmly secured to the axle and thoroughly protected against any separation therefrom or movement thereon due to the shocks which are imparted at times to the vehicle. The upper leaf 17 of the spring 16 is centrally secured to the transverse spring 13 and the chassis 12 of the car by means of a central bolt 25 passing upwardly through these several parts and also by means of clamps 14 that extend under the upper leaf 17 to and above the top of the chassis where their reduced ends pass through transverse plates 26 and are secured by means of nuts 27 secured on the reduced end and against the plates 26. If desired instead of the U clamps 14 clamping means such as shown in Fig. 4 may be used which, it will be seen, comprises a rectangular plate 28 having upstanding legs 29 at each corner with reduced screw threaded upper ends 30. This clamp is placed with the plate 28 against the leaf 17 of the spring 16, the legs 29 of which pass upwardly in front of and behind the chassis 12 carrying the reduced threaded upper ends 30 above the same where the cross plates 26 are placed over said ends and nuts 27 screwed thereon, thus firmly clamping both springs 16 and 13 to the chassis. The clamp is further secured by means of the bolt 25 passing through a central hole 31 in the plate 28.

A car supported by an elliptic spring such as 13 is greatly improved by means of the supplemental spring of the present invention as it renders the car more rigid, improves the steering, making the same more reliable, causes the car to travel smoother, and all swaying movements due to the resiliency of the semi-elliptic spring and the manner of hanging the body thereon is practically eliminated.

What I claim is:

The combination with an axle and the semi-elliptic spring of an automobile supported at its ends upon said axle and in line therewith by links mounted to swing in the plane of the axle, of a supplemental elliptic spring between said axle and said semi-elliptic spring, means for securing the lower member of said elliptic spring to the axle, and means for securing the upper member of said elliptic spring and the semi-elliptic spring at their central points to the frame of the vehicle, said means comprising a plate adapted to bear upon the inner surface of said upper member of the elliptic spring and having integral upstanding legs to project above said frame in front and behind thereof, cross plates adapted to extend forwardly and rearwardly across the front of the frame and be clamped to said parts by nuts, and a bolt passing upwardly through said plate, both springs and the frame and fastened by a nut.

In testimony whereof I affix my signature in presence of two witnesses.

JOSIAH N. UNDERWOOD.

Witnesses:
WARREN SORRELL,
E. A. VON DE VELET.